US006420712B1

(12) United States Patent
Menlove et al.

(10) Patent No.: US 6,420,712 B1
(45) Date of Patent: Jul. 16, 2002

(54) COSMIC RAY NEUTRON BACKGROUND REDUCTION USING LOCALIZED COINCIDENCE VETO NEUTRON COUNTING

(75) Inventors: Howard O. Menlove; Steven C. Bourret; Merlyn S. Krick, all of Los Alamos, NM (US)

(73) Assignee: The Regents of the University of California, Oakland, CA (US)

( * ) Notice: Subject to any disclaimer, the term of this patent is extended or adjusted under 35 U.S.C. 154(b) by 102 days.

(21) Appl. No.: 09/609,670

(22) Filed: Jul. 3, 2000

(51) Int. Cl.[7] .................................................. G01T 3/00
(52) U.S. Cl. .............................. 250/390.01; 250/370.05
(58) Field of Search ...................... 250/390.01, 390.07, 250/390.12, 391, 370.05

(56) References Cited

PUBLICATIONS

Menlove et al, Passive Neutron Design Study for 200–L Waste Drums, Los Alamos National Laboratory LA–13333–MS, 1997.*

*High–Sensitivity Measurements for Low–Level TRU Wastes Using Advanced Passive Neutron Techniques*, H. O. Menlove and G. W. Eccleston, Publication No. LA–UR–92–2563, presented at the Transuranic Waste Characterization Conference, Idaho State University, Pocatello, Idaho, Aug. 10–12, 1992.

*Thermal Neutron Multiplicity Counting of Samples with Very Low Fission Rates*, M. S. Krick, Publication No. LA–UR–97–2649, presented at the 38th Annual Meeting Institute of Nuclear Materials Management, Phoenix, AZ, Jul. 20–24, 1997.

*Statistical Data Filtration in Neutron Coincidence Counting*, D. H. Beddingfield and H. O. Menlove, Los Alamos Informal Report No. La–12451–MS, Nov. 1992.

* cited by examiner

Primary Examiner—Georgia Epps
Assistant Examiner—Richard Hanig
(74) Attorney, Agent, or Firm—DeWitt M. Morgan

(57) ABSTRACT

This invention relates to both the apparatus and method for increasing the sensitivity of measuring the amount of radioactive material in waste by reducing the interference caused by cosmic ray generated neutrons. The apparatus includes: (a) a plurality of neutron detectors, each of the detectors including means for generating a pulse in response to the detection of a neutron; and (b) means, coupled to each of the neutrons detectors, for counting only some of the pulses from each of the detectors, whether cosmic ray or fission generated. The means for counting includes a means that, after counting one of the pulses, vetos the counting of additional pulses for a prescribed period of time. The prescribed period of time is between 50 and 200 $\mu$s. In the preferred embodiment the prescribed period of time is 128 $\mu$s. The veto means can be an electronic circuit which includes a leading edge pulse generator which passes a pulse but blocks any subsequent pulse for a period of between 50 and 200 $\mu$s. Alternately, the veto means is a software program which includes means for tagging each of the pulses from each of the detectors for both time and position, means for counting one of the pulses from a particular position, and means for rejecting those of the pulses which originate from the particular position and in a time interval on the order of the neutron die-away time in polyethylene or other shield material. The neutron detectors are grouped in pods, preferably at least 10. The apparatus also includes means for vetoing the counting of coincidence pulses from all of the detectors included in each of the pods which are adjacent to the pod which includes the detector which produced the pulse which was counted.

16 Claims, 3 Drawing Sheets

US 6,420,712 B1

COSMIC RAY NEUTRON BACKGROUND REDUCTION USING LOCALIZED COINCIDENCE VETO NEUTRON COUNTING

This invention was made with government support under contract W-7405-ENG-36 awarded by the U.S. Department of Energy. The government has certain rights in this invention.

FIELD OF THE INVENTION

The present invention relates to apparatus for and a method of reducing cosmic-ray background interference for improved neuron coincidence counting. More specifically, the present invention utilizes localized neutron coincidence veto ("LCV") to eliminate the counting of cosmic-ray generated background neutrons which have small multiplicity.

BACKGROUND OF THE INVENTION

Waste materials contaminated with small amounts of plutonium and other transuranic isotopes represent a major disposal problem. The higher the level of, for instance, plutonium, the more expensive the disposal (i.e., storage) cost. Enormous sums have been spent on long term waste storage sites, such as the Waste Isolation Pilot Plant in New Mexico for plutonium contaminated material.

As the neutrons emitted by plutonium can penetrate through the matrix materials of the boxes, drums and crates that are used to hold contaminated waste, passive neutron counting is the most effective method of measuring plutonium in bulk waste containers. To obtain a quantitative relationship between the neutron emission rate and the mass of the plutonium in a given volume of waste material (e.g. in a drum), it is necessary to count the time-correlated (i.e., coincidence) neutrons from the waste to determine the spontaneous fission rate. Detectors large enough to hold 200 liter drums of waste, in which thermal neutron counters are embedded in polyethylene walls, have been used for this purpose. Typically, such detectors will completely surround the waste container, for high counting efficiency to make the coincidence counting practical.

The primary limitation to the sensitivity (i.e., lower detectability limit) of the above described detection method is background interference caused by cosmic rays in the neutron counter and its immediate vicinity. The primary source is the carbon in the polyethylene detector body and adjacent polyethylene shield. Cosmic rays from space react with this carbon to create bursts of neutrons that interfere with the neutron coincidence counting of the sample.

Cosmic ray spallation (i.e., a nuclear reaction in which the energy of each incident particle is so high that more than two or three particles are ejected from the target nucleus) events create multiple neutrons detected in the neutron counter with a large range of multiplicity events. The large multiplicity events (i.e., more than three neutrons per fission) in the background can be separated from plutonium spontaneous fission by virtue of their high multiplicity. Spontaneous fission events from plutonium emit only a few neutrons (i.e., 1–5) per fission event, and only a couple of these are typically detected. Multiplicity sorting and statistical testing have been used to separate the cosmic ray initiated multiplicity events from the plutonium origin spontaneous fission neutrons. However, this is not a complete solution to the interference problem, as about 60% of the cosmic ray background neutrons have only a small multiplicity that is the same as for the plutonium neutrons. Multiplicity sorting and statistical testing are described in, respectively: M. S. Krick, "Thermal Neutron Multiplicity Counting of Samples With Very Low Fission Rates," Los Alamos National Laboratory report LA-UR-97-2649 (1997); and D. H. Beddingfield and H. O. Menlove, "Statistical Data Filtration in Neutron Coincidence," Los Alamos National Laboratory report LA-12451-MS (November 1992). The general problem of cosmic ray spallation interference with low activity plutonium measurements using neutron coincidence counting is discussed in H. O. Menlove and G. W. Eccleston, "High-Sensitivity Measurements for Low-Level Tra Wastes Using Advanced Passive Neutron Techniques," Los Alamos National Laboratory report LA-UR-92-2563 (1992).

In addition to cosmic ray spallations from the carbon in the polyethylene detector body and adjacent shield, metals, such as iron in the waste and containers, are an additional source of cosmic ray spallation neutrons that limit plutonium detection sensitivity. These spallation events in the metal often generate high multiplicity neutrons that can be eliminated by the truncated multiplicity technique (as referenced in Krick, supra) or by the statistical data filter technique (as referenced in Beddingfield, et al., supra). However, there is a number (about half) of these spallation events that only produce a count of two neutrons (i.e., a doubles event). The number of counts with high multiplicity can be used to predict (by extrapolation) the number of doubles counts. This method is accurate to about 2–3%, depending on the counting statistics. However, counting times of approximately 15 minutes are required to obtain adequate statistics for high multiplicity counts. The weight of the metal in the container can also be used to predict the coincidence background. However, this method has a large statistical fluctuation, which limits the plutonium detector sensitivity.

It is an object of the present invention to more accurately measure plutonium and other transuranic materials in waste materials.

It is another object of the present invention to measure plutonium in waste to a lower level of detection and, thus, save on the costs associated with storage and/or transportation of such waste.

It is another object of the present invention to reduce the counting of cosmic ray generated background neutrons having a small multiplicity.

It is yet another object of the invention to separate plutonium source neutrons from cosmic ray background neutrons to improve the accuracy and sensitivity of sorting nuclear wastes. Such improved accuracy will reduce the costs associated with storage of such wastes.

It is yet another object of the present invention to eliminate the small cosmic-ray multiplicity events which escape the above described truncation method.

It is yet still another object of the present invention to improve plutonium measurement sensitivity by eliminating from the counting many of the cosmic ray neutrons that are born in the waste being sample.

SUMMARY OF THE INVENTION

This invention relates to both the apparatus and method for increasing the sensitivity of measuring the amount of radioactive material in waste by reducing the interference caused by cosmic ray generated neutrons. The apparatus includes: (a) a plurality of neutron detectors, each of the detectors including means for generating a pulse in response to the detection of a neutron; and (b) means, coupled to each of the neutrons detectors, for counting only some of the pulses from each of the detectors, whether cosmic ray or fission generated. The means for counting includes a means that, after counting one of the pulses, vetos the counting of additional pulses for a prescribed period of time. The prescribed period of time is between 50 and 200μs. In the preferred embodiment the prescribed period of time is 128μs. The veto means can be an electronic circuit which includes a leading edge pulse generator which passes a pulse but blocks any subsequent pulse for a period of between 50 and 200μs. Alternately, the veto means is a software program which includes means for tagging each of the pulses from each of the detectors for both time and position, means for counting one of the pulses from a particular position, and means for rejecting those of the pulses which originate from the particular position and in a time interval on the order of the neutron die-away time in polyethylene or other shield material. The neutron detectors are grouped in pods, preferably at least 10. The apparatus also includes means for vetoing the counting of coincidence pulses from all of the detectors included in each of the pods which are adjacent to the pod which includes the detector which produced the pulse which was counted.

The method for increasing the sensitivity of measuring the amount of radioactivity in waste by reducing the interference caused by cosmic ray generated neutrons includes: (a) providing a plurality of neutron detectors, each of the detectors including means for generating a pulse in response to the detection of a neutron; (b) counting only some of the pulses from each of the detectors; and (c) vetoing the counting of coincidence pulses from each of the detectors for a prescribed period of time after the counting.

DESCRIPTION OF THE PREFERRED EMBODIMENTS

Figure 1:
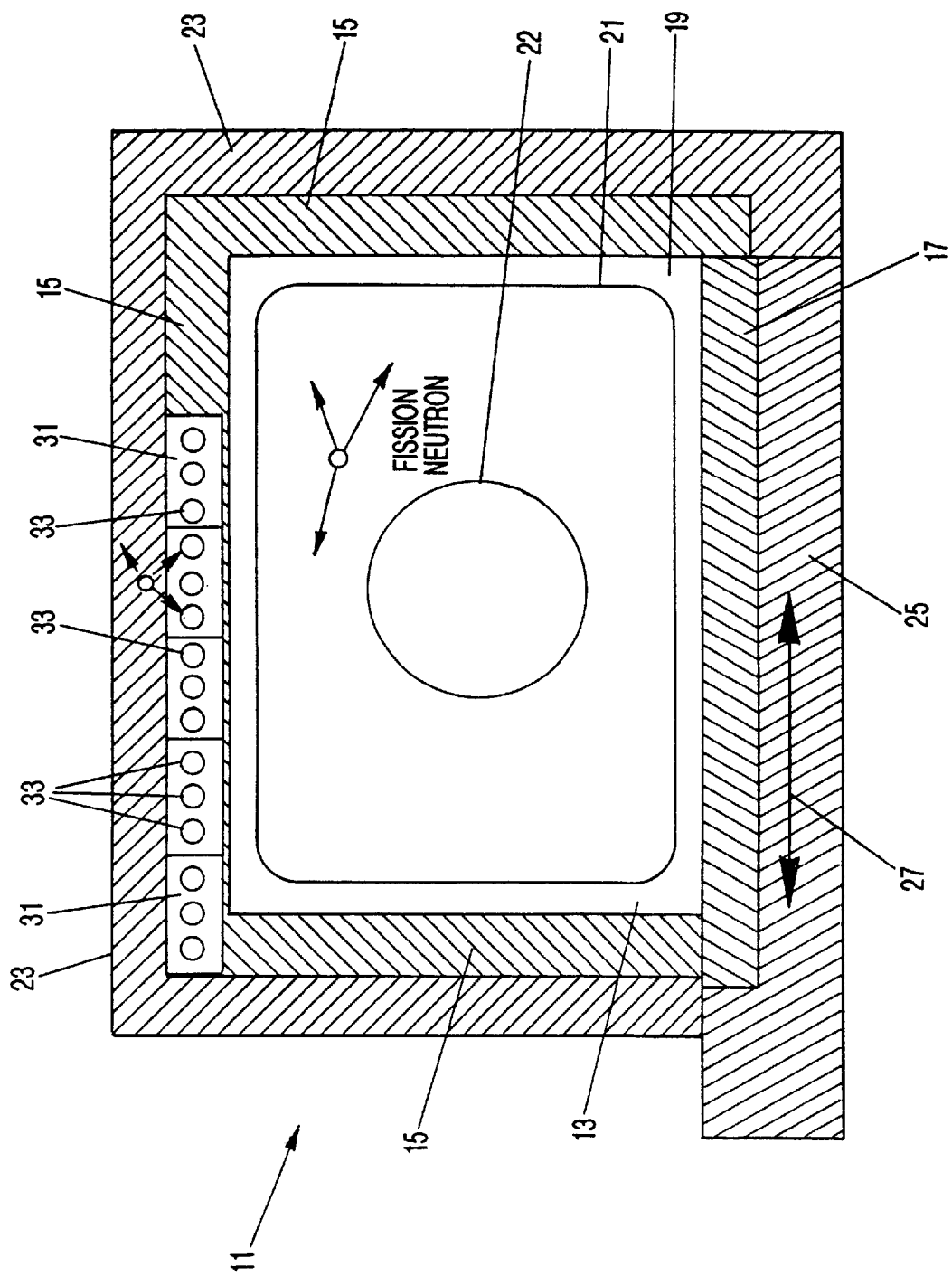
FIG. 1 is a top sectional view of the detector of the present invention, showing 5 of the 52 detector modules and a typical cosmic ray spallation event in the detector shield.

As stated above, the primary source of cosmic ray spallation is the carbon in the polyethylene detector body and the adjacent polyethylene shield. Each of the spallation neutrons, which are created in the polyethylene, are attenuated as they migrate away from the point of birth. For instance, in 10 cm of polyethylene, the cosmic ray neutron population attenuates by a factor of, about, 5–10.

The present invention utilizes what we have termed localized neutron coincidence veto (LCV) methods to eliminate those cosmic-ray background neutrons having small multiplicity. More specifically, if two or more neutrons (whether from fission of Pu, or cosmic ray generated) arrive in a local volume of the detector in a given time window (0–128 μs), the coincidence event is rejected in the data analysis. To reject these cosmic ray coincidence neutrons, the detector of the present invention is separated into a plurality of separate modules (sometimes referred to as pods). A minimum number of about 10 modules is typically required. There is no maximum number. Further, each module is designed to count only one neutron (whether cosmic ray or Pu generated) followed by a time delay of approximately 128 μs before the next neutron can be counted. This design rejects most of the coincidence events from cosmic-ray spallation in the detector and shield because the neutron die-away time in polyethylene is, approximately, 50–100 μs and because more than 75% of these neutrons fall within the time gate of 128μs. Thus, the second and third neutron that have to be counted to give a coincidence event are not registered by the detector electronics described below. In contrast, because Pu generated neutrons are from the sample volume in the cavity, there is only a low probability (i.e., approximately 10%) that both of the coincidence neutrons end up in the same or immediately adjacent detector module.

The LCV technique of the present invention also provides a better method of rejecting spallation neutrons that are born in the waste sample being analyzed by virtue of the direction of these spallation neutrons. The spallation neutrons that are born in the waste sample are emitted in a forward cone so that they enter the detector in a local area. Because of this, the LCV apparatus described below only permits the first of these sample born spallation neutrons to be counted, while the additional neutrons from the same spallation event are rejected. This eliminates the coincidence count.

The plutonium in the waste sample will still give coincidence counts by virtue of the 10–50 cm separation between the waste sample and the detector modules. Each module counts the first plutonium generated neutron and rejects the following neutrons from the same spontaneous fission event. Because of the small solid angle (between 0 and 4 sterradians) between the sample and the individual detector modules, the probability of detecting two or more neutrons in the same module is acceptably small (about 10%), so the ability to count the plutonium source neutrons is only reduced by 10–20%.

With reference to FIG. 1, detector 11 includes a bottom 13, a top (not shown), three fixed side sections generally designated 15, and a door section 17. These components define a cavity 19 in which a box 21, or a 200 liter drum 22 (or other suitable container) holding waster material is placed for detection of plutonium and other transuranic materials. (Though both the drum and the box are illustrated, only one or the other would be in cavity 19 at any one time.) While an air gap is illustrated between box 21 and the interior walls of cavity 19, none is required. Conversely, there is no maximum air gap. The waste container can be made of any material, including steel, wood, plastic, and cardboard. (The material in the waste container may also include steel, plastic, wood and cardboard.) Surrounding the top, bottom 13, and sides 15 is a layer of polyethylene 23. Door 17 is also covered with a layer of polyethylene 25. To remove cosmic ray generated neutrons that are external to detector 11, layers 23 and 25 are, approximately, 6 inches thick. As indicated by arrow 27, door 17 slides sideways. As they form no part of the present invention, the mechanisms for supporting and opening and closing door 17 are not disclosed.

As is also shown in FIG. 1, detector 11 includes a plurality of detector veto pods 31 (or modules), a few of which are illustrated. In the preferred embodiment there are a total of 52 pods, 22 pods are included in sides 15; 10 pods, in door 17; and 10 pods in each of the top and bottom 13. Each pod 31 includes 5 detector tubes 33 embedded in polyethylene casing 15. For convenience of illustration, each pod is shown as having only 3 tubes 33. As those skilled in the art will appreciate, the number of tubes per pod and the number of pods can be varied. The greater the number of tubes surrounding a cavity of a given size, the greater the efficiency of the design. However, increasing the number of tubes (whether tubes per pod, or pods) increases the cost of the detector. As those skilled in the art will also appreciate, each tube 33 includes a casing (not shown), an anode wire (also not shown) and is filled with $^3$He. Each anode wire is connected to a source of high voltage, a capacitor and a resistance. As this arrangement is well known in the art it has not been illustrated. As is also well known, the ionization resulting from a thermal neutron colliding with a $^3$He molecule produces a voltage pulse.

Figure 2:
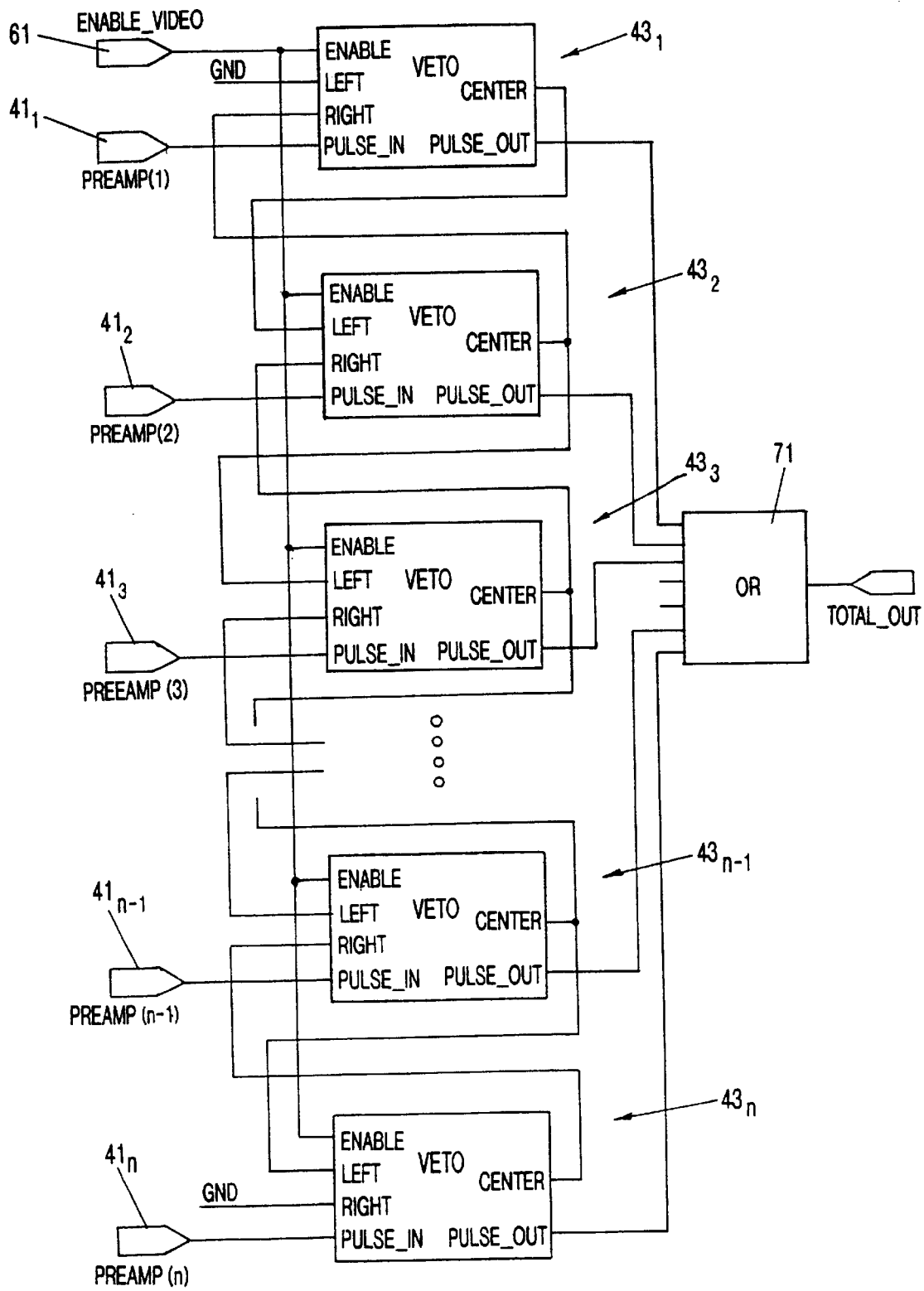
FIG. 2 is a diagram of the circuit between the detector modules and a conventional neutron pulse time-correlation analyzer (not shown) used to implement the localized coincidence neutron veto (LCV) of the present invention in a multi-channel system.
Figure 3:
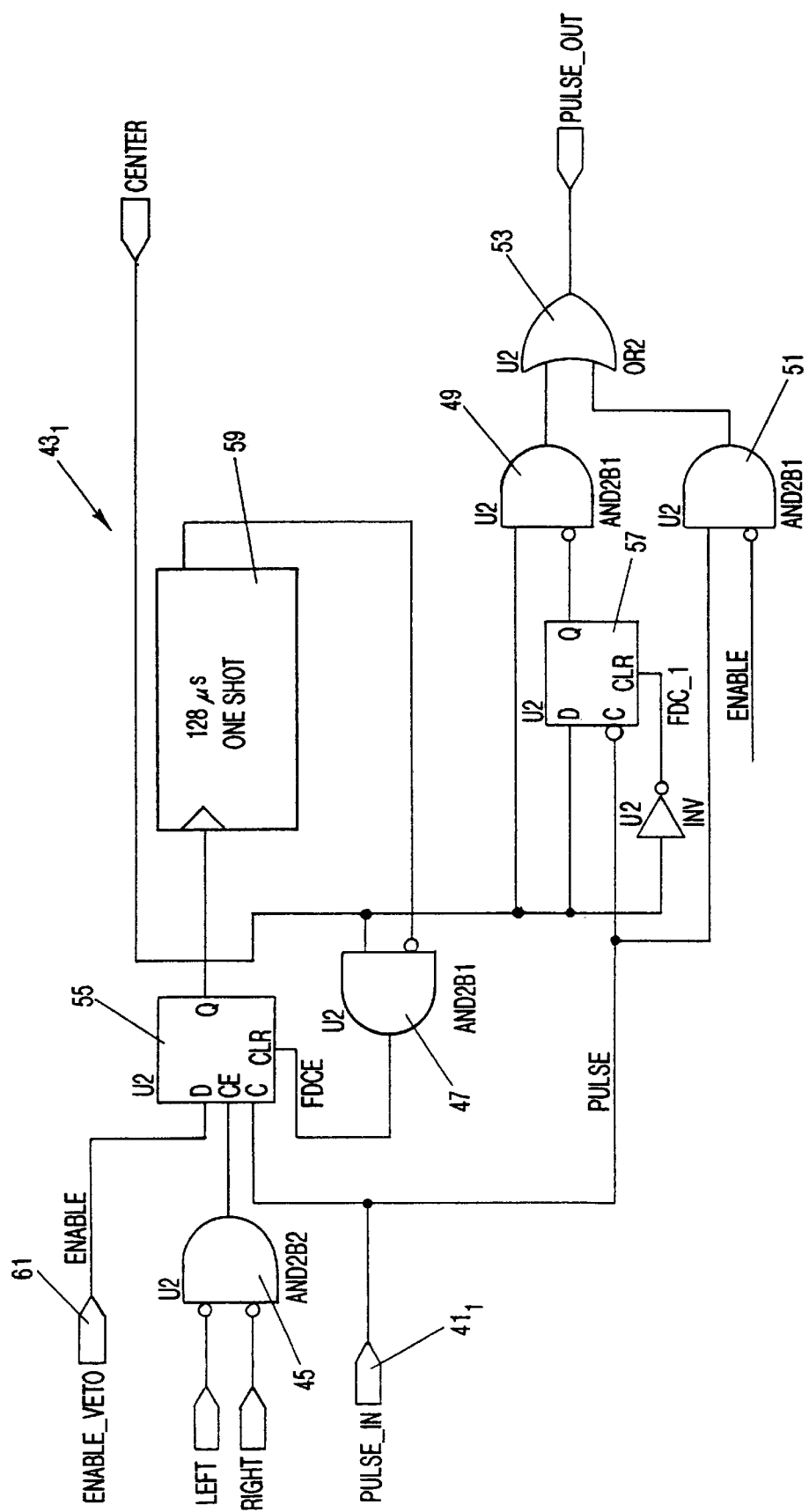
FIG. 3 is a detailed view of the electronic circuit used to provide the LCV with a floating centroid to veto the two adjacent amplifiers to the amplifier that initiated the coincidence veto.

The LCV circuitry of the present invention is illustrated in FIGS. 2 and 3. The voltage pulses from each of the 5 $^3$He filled tubes 33 of each pod 31 are connected to, for instance, preamp 411 which amplifies the voltage pulses and transmits them to the LCV (or veto) circuit $43_1$. In the preferred embodiment AMPTEK model A111 preamps are used. The signal from preamp $41_1$ is fed to veto circuit $43_1$. Circuit $43_1$ includes: negative input AND gates 45, 47 and 49 and 51; 53 is a logical OR; 55 and 57 are D flip flops used to store signals; and 59 (128µs One Shot) is a leading edge pulse generator having a 128 µs pulse. Veto circuit $43_1$ also includes an enable/veto switch 61. Except for enable/veto switch, veto circuits $43_2$–$43_n$ (wherein $n$ is the total number of pods) are identical to veto circuit $43_1$.

FIG. 2 shows the interconnections between the veto circuits $43_1$–$43_n$ (where, again, n is the total number of pods or modules) for each pod $31_1$–$31_n$ and the connection between each veto circuit and OR circuit 71, which combines the output of all the veto circuits. The combined output signal from OR circuit 71 goes to a commercial coincidence logic to register the counts. For samples with high counting rates, the enable/veto switch 61 is used to directly send the signals from the preamplifiers $41_{1-n}$ to the coincidence logic register to avoid dead time losses.

In operation, any pod that receives a neutron pulse sets a time delay that vetoes subsequent pulses for a period that is longer (100–200 µs) than the neutron die-away time in the detector. For detector 11, the die-away time is about 60 µs, so a time delay gate of 100–200 µs eliminates over 95% of the subsequent neutrons. More specifically, the signal from a preamp 41 triggers the "One Shot" that gets stored in the FDCE flip-flops. The signal passes on but additional follow on signals are blocked for the 128 µs One Shot time interval. This prevents two signal pulses from being in coincidence from that the same detector pod.

To make the veto volume (i.e., the volume for rejection of the second neutron) greater than the transmission distance (from birth to absorption) of the spallation neutrons in the polyethylene, the present invention vetoes the amplifier that receives the pulse as well as the amplifiers of the two adjacent pods. The center output of each veto circuit connects to the two adjacent veto circuits (i.e., "left" and "right" of AND gate 45) to trigger the vetos in the two nearest pods. Thus, each spallation event is always in the center of a three amplifier detector volume, wherein the center amplifier is defined by the first pulse.

As an alternative to the anti-correlation circuitry in the above described detector electronics, all of the amplifier outpost pulses can be collected in a computer and software provided to eliminate the localized neutron count from cosmic ray spallation (both from the polyethylene and any metal in the waste box). The data collected can be tagged for position and time, and those multiple counts from the same local position in a time interval on the order of the neutron die-away time in polyethylene can be rejected. This is the same principle as the electronic rejection in the hardware, but the rejection is done in the software.

Table I sets forth the results obtained from 5 amplifier channels of the LCV system of the present invention. The off/on ratio in Table I represents the counting rate reduction factor for the different neutron sources tested. The primary result is the reduction of the cosmic ray spallation neutrons by a factor of 6. Adding 100 kg of lead near side 15 of cavity 19 increased the coincidence neutron spallation background count from 0.126 to 1.560, a factor of 12.4. However, the LCV of the present invention decreased the interference caused by the lead background by a factor of 4.

TABLE I

Prototype cosmic-Ray Veto Counter Data

| Sample Type | Veto | Singles (count/s) | Doubles (count/s) | Triples (count/s) | D Ratio off/on |
|---|---|---|---|---|---|
| Empty Detector | off | 17.58 | 0.126 | 0.242 | 6.01 |
| Empty Detector | on | 18.05 | 0.021 | 0.001 | |
| $^{240}$Pu sample[a] | off | 74.36 | 2.66 | 0.14 | 1.12 |
| $^{240}$Pu sample[a] | on | 72.79 | 2.38 | 0.11 | |
| 45 kg Pb on wall | off | 20.14 | 1.56 | 2.52 | 4.01 |
| 45 kg Pb on wall | on | 19.85 | 0.39 | 0.064 | |

D represents doubles.
[a]$^{240}$Pu corresponds to a 0.7 gram sample located in the center of waste box 21.

For plutonium mass values above about 5 grams, the low background reduction provided by the LCV is not needed and the LCV circuitry is automatically turned off to avoid deadtime losses at high counting rates, where the background suppression of the present invention is not needed. Enable/veto switch 61 is controlled by conventional software which monitors the totals rate. For totals rates above a selected threshold in the software that is based on the counting rate, the LCV circuitry is automatically disabled.

The minimum detectable mass limit for plutonium in a passive neutron measurement system depends on the neutron background from cosmic-ray spallation. The LCV method can reduce the background by about an order of magnitude. By combining the LCV method with the existing techniques that can reject high multiplicity events one can measure large waste containers with better accuracy and sensitivity than was previously possible to sort radioactive wastes with better precision and control. Thus, the wastes can be directed to the appropriate waste sites with the accompanying cost savings.

Whereas the drawings and accompanying description have shown and described the preferred embodiment of the present invention, it should be apparent to those skilled in the art that various changes may be made in the form of the invention without affecting the scope thereof.

We claim:
1. Apparatus for increasing the sensitivity of measuring the amount of radioactive material in waste utilizing localized neutron coincidence vetoes to reduce the interference caused by cosmic ray generated neutrons, said apparatus comprising:
   a) a plurality of neutron detectors, each of said detectors including means for generating a pulse in response to the detection of a neutron; and
   b) means, coupled to each of said neutron detectors, for counting only some of said pulses from each of said detectors, whether cosmic ray or fission generated, said means for counting including means that, after count- ing one of said pulses from a given one said detectors, vetos the counting of additional ones of said pulses for a prescribed period of time from said given one of said detectors without vetoing all of said pulses from all of said detectors.

2. The apparatus of claim 1, wherein said prescribed period of time is between 50 and 200 μs.

3. The apparatus of claim 2, wherein said prescribed period of time is 128 μs.

4. The apparatus of claim 1, wherein said veto means is an electronic circuit.

5. The apparatus of claim 4, wherein said veto means includes a leading edge pulse generator which passes said one of said pulses but blocks any subsequent pulse from said given one of said detectors for a period of between 50 and 200 μs.

6. The apparatus of claim 1, wherein said veto means is a software program.

7. The apparatus of claim 6, wherein said software program includes means for tagging each of said pulses from each of said detectors for both time and position, means for counting one of said pulses from a particular position, and means for rejecting those of said pulses which originate from said particular position and in a time interval on the order of the neutron die-away time in polyethylene or other suitable material.

8. The apparatus of claim 1, wherein said neutron detectors are grouped in pods.

9. The apparatus of claim 8, further including a plurality of means for counting and a like plurality of veto means, and wherein all said detectors included in a particular one of said pods are coupled to a one of said plurality of means for counting and to one of said veto means, said veto means vetoing said counting of said additional one of said pulses from all of said detectors included in said pod.

10. The apparatus of claim 9, further including means for vetoing said counting of said additional ones of said pulses from all of said detectors included in each of said pods which are adjacent to said pod which includes said detector which produced said pulse which was counted.

11. The apparatus of claim 8, wherein there are at least 10 of said pods.

12. The apparatus of claim 1, wherein said detectors are supported by a layer of material which shields said waste from neutrons generated outside of said layer.

13. The apparatus of claim 1, further including means for disabling said veto means for high counting rates.

14. A method for increasing the sensitivity of measuring the amount of radioactivity in waste utilizing localized neutron coincidence vetoes to reduce the interference caused by cosmic ray generated neutrons, said method including the steps of:

a) providing a plurality of neutron detectors;

b) generating pulses from each of said neutron detectors in response to the detection of neutrons by each said neutron detector, each of said pulses corresponding to the detection of a neutron;

c) for each neutron detector counting one of said pulses; and c) for each of said neutron detectors, after said counting of said one of said pulses, vetoing the counting of additional ones of said pulses for a prescribed period of time.

15. The method of claim 14 wherein said prescribed period of time is between 50 and 200 μs.

16. The method of claim 14, wherein after said counting of said one of said pulses, also vetoing the counting of additional ones of said pulses for said prescribed period of time from detectors adjust to said detector for which said pulse was counted.

* * * * *